United States Patent [19]

LaPointe

[11] 4,238,209
[45] Dec. 9, 1980

[54] GAS DRYING APPARATUS

[75] Inventor: Gabriel M. LaPointe, Worcester, Mass.

[73] Assignee: Ramco Industries, Inc., Providence, R.I.

[21] Appl. No.: 927,603

[22] Filed: Jul. 24, 1978

[51] Int. Cl.$^3$ .............................................. B01D 53/06
[52] U.S. Cl. ...................................... 55/181; 55/208; 55/390
[58] Field of Search ................. 34/32, 71, 80, 95, 138; 55/33, 34, 60-62, 77, 78, 179-181, 208, 387, 390, 474; 210/293

[56] References Cited

U.S. PATENT DOCUMENTS

| | | | |
|---|---|---|---|
| 2,101,555 | 12/1937 | Moore et al. | 55/179 X |
| 2,478,393 | 8/1949 | Haarman | 34/80 |
| 2,507,608 | 5/1950 | Miller | 55/181 |
| 2,625,237 | 1/1953 | Gribler et al. | 55/179 X |
| 2,965,196 | 12/1960 | Rich, Jr. | 55/78 |
| 2,995,208 | 8/1961 | Hachmuth et al. | 55/180 X |
| 3,487,608 | 1/1970 | Graff | 55/179 X |
| 3,757,492 | 9/1973 | Graff | 55/181 |
| 4,003,136 | 1/1977 | Vincent et al. | 34/30 X |
| 4,022,560 | 5/1977 | Heinonen | 34/80 X |

OTHER PUBLICATIONS

Machinery and Equipment, Modern Plastics, Apr. 1977, p. 96.
Whitlock, *Dehumidified Drying Air as a Plastics Plant Service*, The Society of the Plastics Industry, Inc., Nov. 19, 1971.
Weiner, *Dynamic Fluid Drying*, Chemical Engineering, Sep. 16, 1974.

*Primary Examiner*—Robert H. Spitzer
*Attorney, Agent, or Firm*—Norman S. Blodgett; Gerry A. Blodgett

[57] ABSTRACT

Gas drying apparatus consisting of two vertical towers each containing desiccant and means causing gas to flow alternately over through the towers to be dried by the desiccant or to dry the desiccant.

5 Claims, 5 Drawing Figures

GAS DRYING APPARATUS

BACKGROUND OF THE INVENTION

There are many situations in business and industry when it is desirable to provide air which is substantially free of water and water vapor. Such a situation exists for instance, in the plastics industry where the air which is used to convey plastic particles into an extruder may not carry water into the system with it without danger to the apparatus and the operator, as well as the quality of the finished product. Generally speaking, air for this purpose is dried by passing it through a desiccant material and then flows to the storage chamber for the plastic material where it serves to preheat and dry the plastic before it enters the extruder. In the past, once the desiccant has been completely soaked with water, it is necessary to take it out of the apparatus and replace it, or in some other way substitute a dryer with a dry desiccant for the dryer previously used. Attempts to solve this problem have resulted in apparatus which is both complex and expensive and has resulted in equipment which is so large and bulky that it is difficult to move it within a plant from one plastic injection machine to another. These and other difficulties experienced with the prior art devices have been obviated in a novel manner by the present invention.

It is, therefore, an outstanding object of the invention to provide a gas drying apparatus containing two bodies of desiccant which are used alternately to dry and to be dried by flow of air.

Another object of the present invention is the provision of a gas drying apparatus which is small in size and which is portable, so that it can be moved from one location to another.

A further object of the instant invention is the provision of a gas drying apparatus consisting of two desiccating (drying) towers which provide long residence time for air in the desiccant and assures extremely high drying efficiency.

It is another object of the instant invention to provide a gas drying apparatus including two desiccating towers in which one tower is drying, the other is being regenerated.

A still further object of the invention is the provision of a desiccating apparatus of the regenerative type in which automatic equipment brings about the alternating process automatically throughout a plastic drying cycle.

It is a further object of the invention to provide a gas drying apparatus in which dry air is heated to a preset selected temperature and delivered to a machine-mounted plenum drying hopper to dry plastic.

It is a still further object of the present invention to provide a gas drying apparatus having mechanism that is readily accessible for repair and maintenance.

With these and other objects in view, as will be apparent to those skilled in the art, the invention resides in the combination of parts set forth in the specification and covered by the claims appended hereto.

SUMMARY OF THE INVENTION

In general, the invention consists of a gas drying apparatus having a supporting frame on which are mounted two tubular towers in spaced-parallel vertical relationship, each tower being carried on the frame for rotation about its axis and adapted to carry a body of desiccant. A cap closes the upper end of each tower and has an aperture, while a base closes the lower end of each tower and also has an aperture. An intake gas manifold is mounted on the frame under the two bases, an outlet manifold overlies the two caps, and a vent manifold overlies the two caps and is located laterally of the outlet manifold. An actuator is provided for rotating the towers simultaneously to alternately connect the apertures of the caps and bases to the manifolds.

More specifically, a purge gas manifold is also mounted on the frame under the two bases and is located laterally of the intake gas manifold. The actuator rotates the towers 90° from a first position to a second position. Each of the cap apertures is provided with an annular seal that is spring-loaded in the upward direction for gas-tight engagement with the outlet manifold and the vent manifold. Each tower has a transverse plate dividing it into an upper desiccant chamber and a lower vestibule. A perforated tube lies concentrically of the tower in the desiccant chamber and has a closed top and an open bottom leading through an aperture in the plate into the vestibule.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
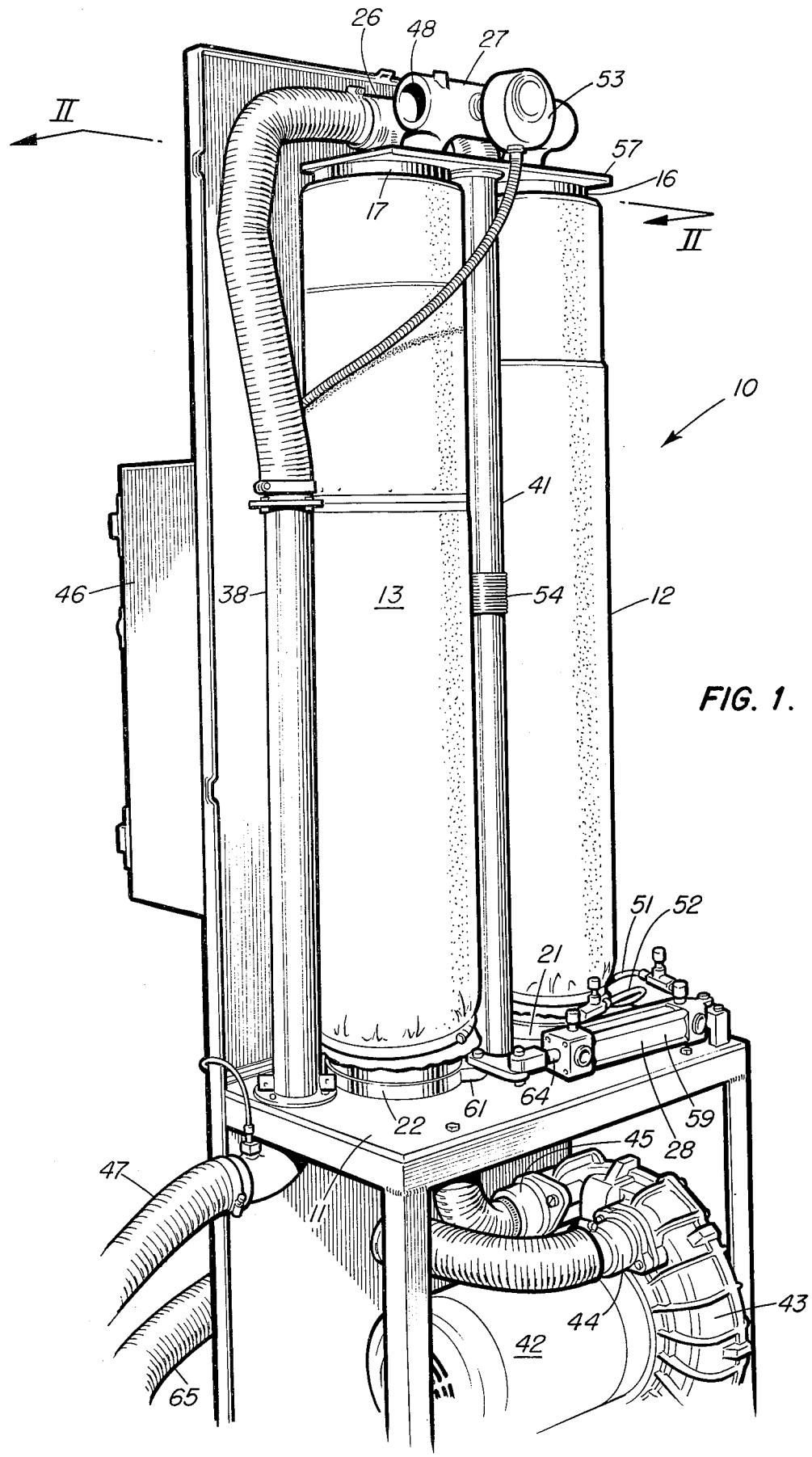
FIG. 1 is a perspective view of a gas drying apparatus embodying the principles of the present invention.

Referring first to FIG. 1, wherein are best shown the general features of the invention, the gas drying apparatus, indicated generally by the reference numeral 10, is shown as having a supporting frame 11 on which are mounted two tubular towers 12 and 13. These towers are mounted on the frame in spaced-parallel vertical relationship, each tower being carried on the frame for rotation about its vertical axis and being adapted to carry a body of desiccant. The caps 16 and 17 close the upper end of each tower 12 and 13, respectively, the caps having apertures 18 and 19, respectively. (See FIG. 2)

Figure 2:
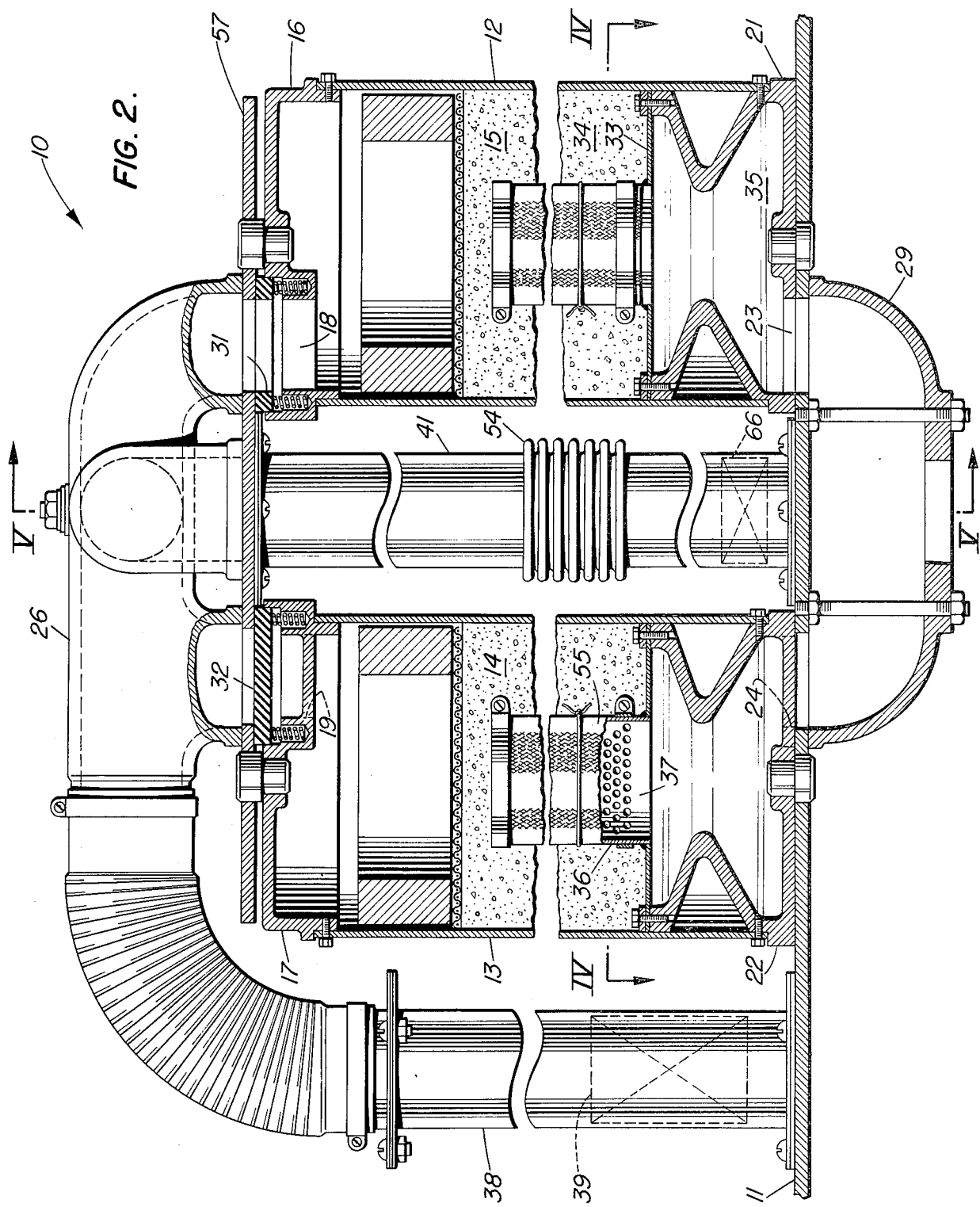
FIG. 2 is a vertical view of the apparatus taken on the line II—II of FIG. 1.

The bases 21 and 22 close the lower end of each tower 12 and 13, respectively, and also have apertures 23 and 24, respectively best shown in FIG. 2. An intake gas manifold 29 is mounted on the frame under the two bases and an outlet manifold 26 overlies the two caps. A vent manifold 27 also overlies the two caps and is located laterally of the outlet manifold 26. An actuator 28 serves to rotate the towers 12 and 13 simultaneously to alternately connect the apertures 18 and 19 of the caps 16 and 17, as well as the apertures 23 and 24 of the bases 21 and 22 to the various manifolds.

Figure 5:
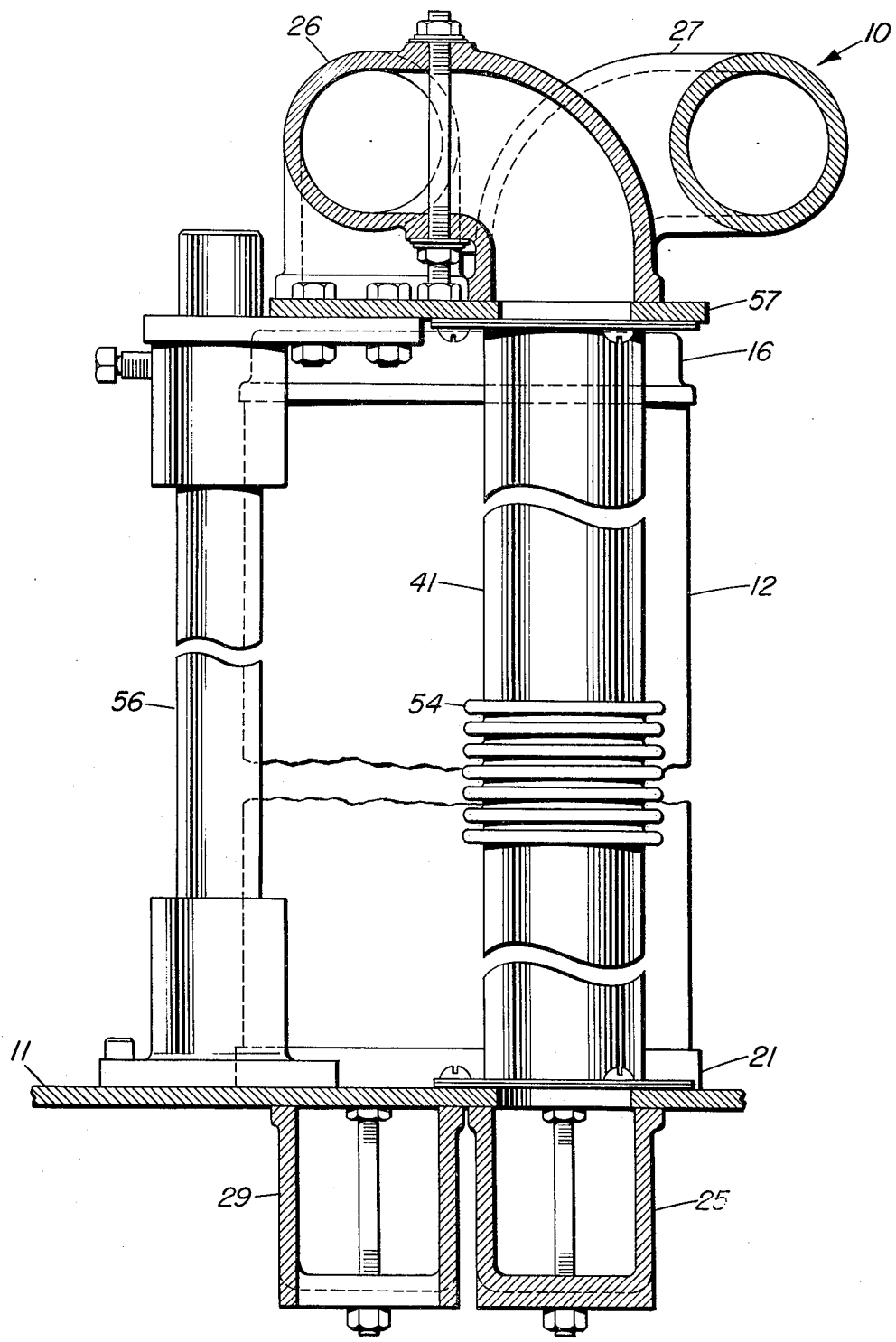
FIG. 5 is a vertical sectional view of the invention taken on the line V—V of FIG. 2.

In FIG. 5 it can be seen that a purged gas manifold 25 is mounted on the frame 11 under the two bases 21 and 22 and is located laterally of the intake gas manifold 29.

Referring to FIG. 2, it can be seen that each of the cap apertures 18 and 19 is provided with an annular seal 31 and 32, respectively, that is spring-loaded in the upward direction for gas-tight engagement with the outlet manifold 26 and the vent manifold 27. The tower 12 has a horizontal transverse plate 33 which divides it into an upper desiccant chamber 34 which carries a body 15 of desicant and a lower vestibule 35. The perforated tube 36 lies concentrically of the tower in the desiccant chamber 34 and has a closed top and an open bottom leading through an aperture 37 in the plate 33 into the vestibule 35. A similar plate and tube are also provided in the tower 13 in association with a body 14 of desiccant. A tube 38 leads from the outlet manifold 26 downwardly to the frame 11 and contains a gas heater 39.

Figure 3:
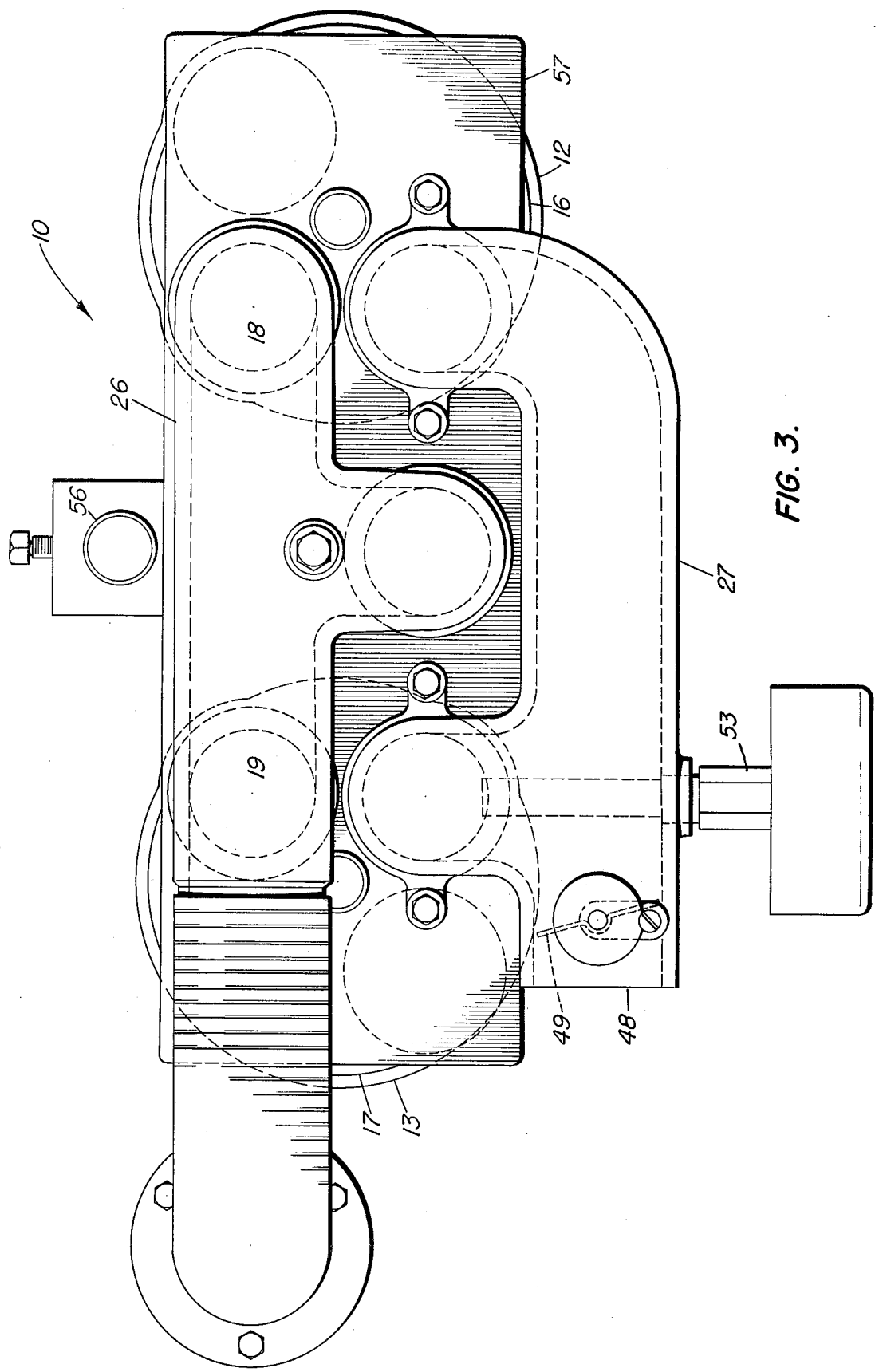
FIG. 3 is a plan view of the apparatus.

A bypass tube 41 leads from the inlet gas manifold 29 to the outlet manifold 26. The vent manifold 27 is best shown in FIG. 3 as having an outlet opening 48 containing a controlled damper 49.

Referring back to FIG. 1, it can be seen that mounted in the frame 11 is an electric motor 42 driving a centrifical fan 43 whose inlet 44 is connected through a filter (not shown) to air from the hopper of a plastic injection molding machine. Its outlet 45 is connected to the inlet air manifold 29. Control box 46 is mounted on the frame and includes electric apparatus for cycling the actuator 28. Conduit 47, incidentally, leads from the bottom of the tube 38 to the hopper containing plastic particulate that is to be dried. Also in FIG. 1 it can be seen that the cylinder 59 forming part of the actuator 28 is of the pneumatic type and is connected by air hoses 51 and 52 to a suitable source of pressurized air. In FIG. 3 it can be seen that a temperature gage 53 is connected to the vent manifold 27 for measuring the temperature of desiccant in the chamber. Cycling is controlled by means of a timer in the control box 46 and the actuator 28. In FIG. 2 it can be seen that the bypass tube 41 is provided with an joint 54. It also can be seen that the tower 13 has its tube covered with a fabric 55 for maintaining the desiccant in the body 14 for moving inside of the tube and becoming entrained in the air. The tube 36 of the tower 12 is provided with a similar filter fabric. FIGS. 3 and 5 shows particularly well the manner in which a support post 56 extends vertically upwardly from the frame 11 and supports at its upper end plate 57 which lies between the towers 12 and 13 on the one hand and the manifolds 26 and 27 on the other hand. A plate is provided with suitable apertures to match the apertures in the caps 16 and 17, as well as the entrances to the manifold. In FIG. 5 it can be seen that the tube 41 is also provided with an expansion joint 54.

Figure 4:
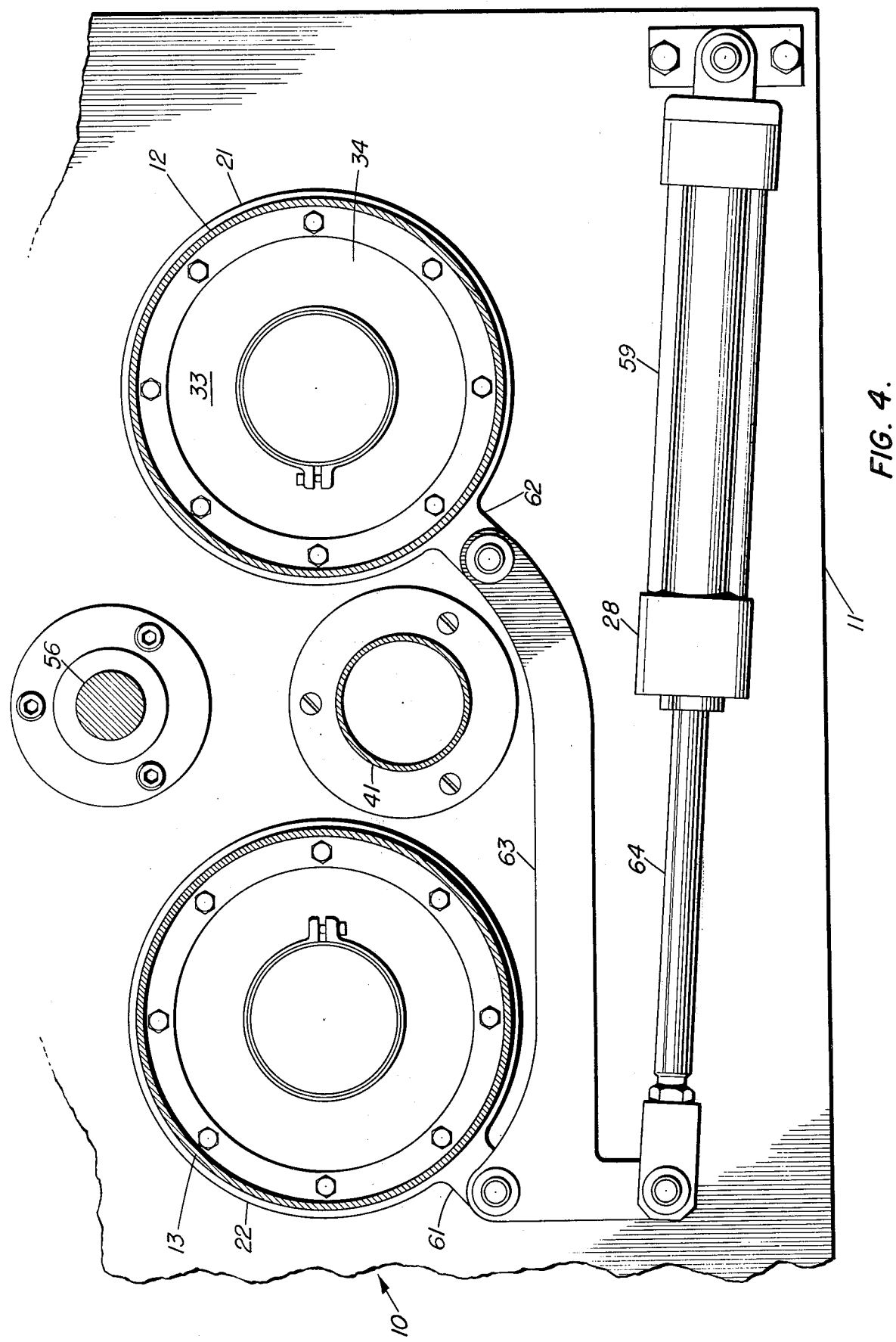
FIG. 4 is a horizontal view of the apparatus taken on the line IV—IV of FIG. 2.

Referring to FIG. 4 it can be seen that the air cylinder 59, forming part of the actuator 28, operates on a link 63 to move the towers 12 and 13 by its connection to arms 61 and 62, respectively.

The operation and advantages of the present apparatus will now be readily understood in view of the above description. The aperture 23 is shown in a so-called first position (in which the aperture 23 in the base of the tower 12 is connected to the intake gas manifold 29). The aperture 18 in the cap 16 of the tower 12 is connected to the outlet manifold 26. The aperture 24 in the base 22 of the tower 13 is connected to the purge gas manifold 25 and the aperture 19 in the cap 17 of the tower 13 is connected to the vent manifold 27. When air is introduced into the cylinder 59 so that the actuator 28 serves to rotate the towers 90° arrives in a second position in which the aperture 23 in the base 21 of the first tower 12 is connected to the purge gas manifold 27. Aperture 18 in the cap 16 of the first tower 12 is connected to the vent manifold 27. The aperture 24 in the base 22 of the tower 13 is connected to the intake gas manifold 29, and the aperture 19 in the cap 17 of the tower 13 is connected to the outlet manifold 26. Thus, in the first position air from the centrifical fan 43 passes into the intake manifold 29, upwardly through the aperture 23, passes through the body 15 of desiccant and out at the top end through the aperture 18 into the outlet manifold 26. From there it passes downwardly through the tube 38, through the heater 39, and passes through the conduit 47 to the hopper full of plastic which is to be dried. At the same time, air in the purge manifold 25 passes through the aperture 24 in the tower 13, through the body 14 of desiccant, through the aperture 19 at its top end into the vent manifold 27 and out into the air, the amount of flow being regulated by the damper 49. Air also arrives at the outlet manifold 26 through the bypass tube 41 and mixes with the air that has arrived after passing through the body 15 of desiccant and the mixture, of course, is heated in the air heater 39 on its way to dry plastic. At the same time also, air is passing through the body 14 of desiccant in the tower 13 and passing outwardly into the atmosphere after going through the manifold 27. This air serves to dry the desiccant in the body 14 and prepare it for a subsequent drying operation. Presumably, by proper regulation of the controls, as soon as the body 15 of desiccant in the tower 12 becomes too wet to do any good in drying air, the body 14 of desiccant in the tower 13 has been dried and is ready to perform a drying operation. At that time the operation of the actuator 28 causes a reversal of the process so that the body 14 dries the air which eventually enters the conduit 47 for use in drying plastic, while the tower 12 is being regenerated; that is to say, the desiccant in the body 15 is being dried by the passage of air over it. It can be seen then that, by use of the present apparatus using two desiccating towers, it is possible to provide long residence time for air in the desiccant and assures extremely high drying efficiency, while one tower is drying air and the other tower is regenerating. This alternating process continues automatically through the plastic drying cycle. Dry air is heated to a preselected temperature and delivered to a floor or machine mounted plenum dry hopper. Under pressure the dry air is diffused and distributed uniformly through the plastic, thus absorbing moisture and heating the plastic simultaneously. Moisture-laden air leaves the top of the hopper to repeat the drying cycle if desired. The control box 46 contains a continuously-cycling cam. A cam timer controls a four-way air operated valve to heat the desiccant beds. Desiccant heat regeneration is controlled by a sensing regulator that is factory set, therefore, the desiccators are completely automatic and require practically no maintenance. In the preferred embodiment the frame 11 is provided with wheels that permits the apparatus to be moved from one location to another within the plant, it only being necessary to connect the equipment to shop pressure air and to electrical source.

It can be seen then that the dry warm air leaves the apparatus 10 in the conduit 47 goes to the hopper containing the plastic to be dried and the air is returned from the top of that hopper through the return line 65 which again enters the centrifical fan 43 for circulation through the apparatus. It is, therefore, a completely closed system with the exclusion of the fact that a certain percentage of the warm moist air which has been passed through a desiccant body to regenerate that desiccant leaves through the outlet 48 into the atmosphere; otherwise the system is completely closed, the air stays warm because it is heated not only by the heater 39 in the tube 38, but also by the heater 66 in the tube 41 leading to the purge manifold 29. It can be seen then that the apparatus operates with the plastic hopper to provide a closed system in which very little heat is lost and the system is not contaminated by introducing large amounts of ambient air which may very well be quite humid.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Gas drying apparatus, comprising:
   (a) a supporting frame,
   (b) two tubular towers mounted on the frame in spaced, parallel vertical relationship, each tower carried on the frame for rotation about its axis and adapted to carry a body of desiccant, each having a transverse plate dividing it into an upper desiccant chamber and a lower vestibule, a perforated tube lying concentrically of the tower in the desiccant chamber and having a closed top and an open bottom leading through an aperture in the plate into the vestibule,
   (c) a cap closing the upper end of each tower and having an aperture, each of the cap apertures being provided with an annular seal that is spring-loaded in the upward direction for gas-tight engagement with an outlet manifold and a vent manifold,
   (d) a base closing the lower end of each tower and having an aperture,
   (e) an intake gas manifold mounted on the frame under the two bases,
   (f) the outlet manifold overlying the two caps,
   (g) the vent manifold overlying the two caps and located laterally of the outlet manifold,
   (h) a purge gas manifold mounted on the frame under the two bases and located laterally of the intake gas manifold, and (i) an actuator for rotating the towers simultaneously 90° for alternately occupying a first position and a second position, wherein in the first position the aperture in the base of a first tower is connected to the intake gas manifold, the aperture in the cap of the first tower is connected to the outlet manifold, the aperture in the base of the second tower is connected to the purge gas manifold, and the aperture in the cap of the second tower is connected to the vent manifold, and wherein in the second position the aperture in the base of the first tower is connected to the purge gas manifold, the aperture in the cap of the first tower is connected to the vent manifold, the aperture in the base of the second tower is connected to the intake gas manifold, and the aperture in the cap of the second tower is connected to the outlet manifold.

2. Gas drying apparatus as recited in claim 1, wherein a tube leads from the outlet manifold downwardly to the frame and contains a gas heater, the tube being adapted to be connected to the bottom of a hopper.

3. Gas drying apparatus as recited in claim 2, wherein a bypass tube leads from the outlet manifold to the purge manifold, and contains a heater.

4. Gas drying apparatus as recited in claim 3, wherein the vent manifold has an outlet opening containing a control damper.

5. Gas drying apparatus as recited in claim 1, wherein a fan drives gas from a hopper containing material to be dried into the intake manifold, through one tower, and into the outlet manifold from which it passes to the hopper containing material to be dried and wherein a portion of the gas in the outlet manifold passes through a bypass tube containing a heater into the purge manifold underlying the said bases, into the other tower, and into the vent manifold.

* * * * *